United States Patent [19]
Graham

[11] Patent Number: 5,261,685
[45] Date of Patent: Nov. 16, 1993

[54] BICYCLE WHEEL AXLE DROPOUT MEMBER

[75] Inventor: David R. Graham, Danbury, Conn.

[73] Assignee: Cannondale Corporation, Georgetown, Conn.

[21] Appl. No.: 851,831

[22] Filed: Mar. 16, 1992

[51] Int. Cl.5 .............................. B62K 19/30
[52] U.S. Cl. .................. 280/279; 280/281.1; 301/111
[58] Field of Search ........... 280/276, 279, 288, 281.1; 301/110.5, 111

[56] References Cited

U.S. PATENT DOCUMENTS 5,020,819  6/1991  D'Aluisio et al. ............... 280/288
5,058,913  10/1991  LaRiviere et al. ............... 280/281.1

FOREIGN PATENT DOCUMENTS 0178727  10/1935  Switzerland ............... 280/288

*Primary Examiner*—Margaret A. Focarino
*Assistant Examiner*—Victor E. Johnson
*Attorney, Agent, or Firm*—Brumbaugh, Graves, Donohue & Raymond

[57] ABSTRACT

A bicycle wheel axle dropout member includes a body portion adapted to be joined to a wheel axle-supporting member of a bicycle and a pair of arm portions extending from the body portion and defining a slot adapted to receive a portion of the bicycle wheel axle in seated relation at the base of the slot. At least one arm portion of the dropout member has a distal part projecting outwardly with respect to the perimeter of the fastener, a hole in the distal part closely adjacent the perimeter of the fastener, and a stop member detachably received in the hole and having a stop head portion positioned abreast of the fastener such as to be engaged by the fastener if the wheel axle should unseat from the base of the slot and to thereby stop the wheel from detaching from the dropout member.

4 Claims, 1 Drawing Sheet

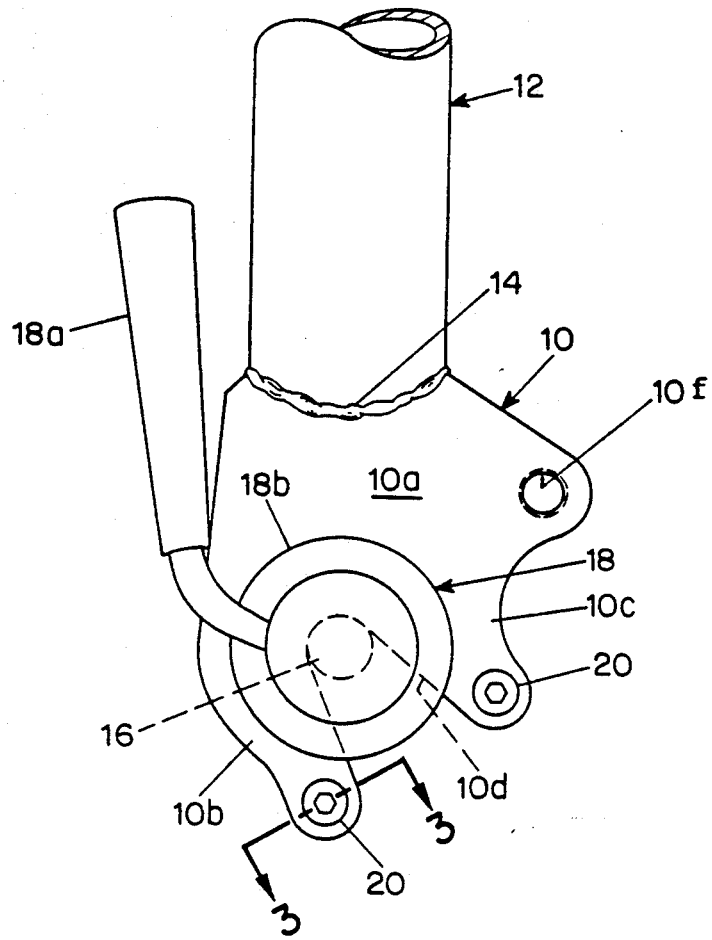
FIG 1
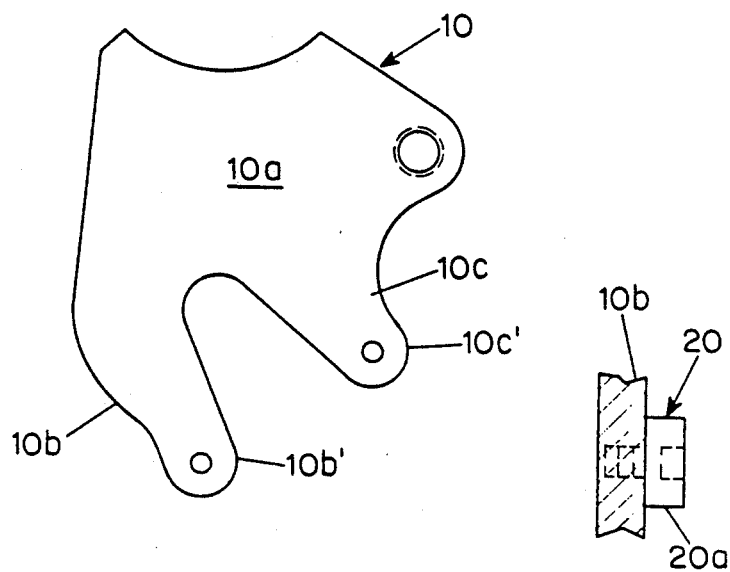
FIG. 2
FIG. 3

BICYCLE WHEEL AXLE DROPOUT MEMBER

BACKGROUND OF THE INVENTION

The wheel axles of bicycles are attached to dropout members on the ends of wheel axle-supporting members of the bicycle (front forks in the case of the front wheels and chain stays in the case of rear wheels). The dropout members have slots that receive the wheel axle in nested relation at the bases of the slots, and the wheel axle is attached to the dropout members by threaded fasteners that clamp it to the dropout members. The threaded fasteners may be ordinary nuts that thread onto threaded end portions of the axle, or they may special nuts that are parts of a fastening assembly known as a "quick release skewer." A quick release skewer has a shaft that passes though a tubular wheel axle, a plain nut threaded onto one end of the shaft, and a cam nut affixed to the other end of the shaft. The cam nut has an operating arm that, when rotated in one direction, loosens a moveable clamping part of the nut and, when rotated in the other direction, tightens the clamping part of the nut.

Like virtually all mechanical devices, the fastening systems for bicycle wheels are not foolproof; if the fastening system is not properly installed, the wheel can detach from the bicycle while it is being ridden, sometimes with unfortunate consequences. In the case of ordinary nuts, they have to be tightened very firmly, which most people recognize and do. Quick release skewers, on the other hand, require the user to understand how they work in order for him or her to correctly install them. The majority of bicyclists whose bicycles are equipped with quick release skewers know how to operate them and have no difficulty in properly and securely installing the wheels. But there are people who do not know how quick release skewers work and do not operate them properly. Those people think that the operating lever is a handle for rotating the shaft and simply tighten (or attempt to tighten) the nut in that way—they do not use the cam nut feature. Those people are very much at risk of having the wheel detach from the bicycle, because hand-tightening the quick release skewer by simply rotating the cam nut and shaft relative to the threaded nut does not sufficiently clamp the wheel to the dropout.

The foregoing problem has not gone unrecognized. Some bicycle manufacturers have provided projecting bosses on the distal parts of the arm portions of the dropouts that form the axle-receiving slot. The bosses are engageable by the perimeters of the axle fasteners, if the axle should unseat from the slots due to looseness of the fasteners, and prevent the wheel from detaching. Accordingly, an improperly installed wheel is retained on the dropouts.

Although the bosses are highly beneficial for bicyclists who are prone, for one reason or another, to not installing their bicycle wheels properly, they are a nuisance to people who want to take advantage of the convenience of a quick release skewer, i.e., the ability to quickly remove a wheel for maintenance by simply loosening the cam nut with the operating lever and to quickly replace the wheel by tightening the cam nut, in each case without the need to turn the threaded nut about the axis of the shaft. When the dropouts have the bosses, the user has to unthread the threaded nut of the skewer to detach the wheel and then retighten the nut to reinstall the wheel. The purpose of the quick release skewer is largely defeated. Accordingly, many experienced bicyclists file or grind the bosses off the dropouts so that they can take advantage of the skewers. And to restore a good appearance, they also have to repaint the dropouts.

SUMMARY OF THE INVENTION

An object of the present invention is to provide a bicycle wheel axle dropout that provides to the user the option of having a means for preventing an improperly installed wheel from detaching or the option of not having such a means. In the former case, the user does not have to worry about a wheel coming off the bicycle; in the latter case, the user is able to remove and reinstall the bicycle wheel more rapidly and easily and take full advantage of the convenience of quick release skewers, when the bicycle is equipped with them.

In accordance with the present invention, there is provided a bicycle wheel axle dropout member adapted to have a bicycle wheel axle affixed thereto by a threaded fastener and having a body portion adapted to be joined to a wheel axle-supporting member of a bicycle and a pair of arm portions extending from the body portion and defining a slot adapted to receive a portion of the bicycle wheel axle in seated relation at the base of the slot. At least one arm portion of the dropout member has a distal part projecting outwardly with respect to the perimeter of the fastener, a hole in the distal part of such arm portion closely adjacent the perimeter of the fastener, and a stop member detachably received in the hole in such arm portion and having a stop head portion positioned abreast of the fastener such as to be engaged by the fastener if the wheel axle should unseat from the base of the slot and to stop the wheel from detaching from the dropout member.

Advantageously, according to preferred embodiments, the hole in the distal part of the arm portion of the dropout member is threaded, and the stop member is a screw that threads into the hole, such as an allen head cap screw having a substantially cylindrical head portion. Allen head cap screws are widely available and hence need not be specially made, and are easy to securely install and to remove, at the user's option. The cylindrical and enlarged form of the heads of allen head cap screws provides a very effective stop function that is uniform without regard to the rotational position of the screw in the hole—the space between the head and the wheel fastener is the same in all rotational positions of the screw. The invention is not, however, limited to screws as stop members; the stop members may be studs or pins press-fitted into holes in the distal parts of the arm portions such that they can be knocked out by the user, if desired.

For a better understanding of the invention, reference may be made to the following description of an exemplary embodiment, taken in conjunction with the accompanying drawings.

DESCRIPTION OF THE DRAWINGS

FIG. 1 is a side elevational view of a wheel-fastening assembly employing an embodiment of a dropout member according to the present invention, the wheel being omitted for clearer illustration;

FIG. 2 is a side plan view of the dropout member of the embodiment of FIG. 1; and FIG. 3 is a cross-sectional view taken along the lines 3—3 of FIG. 1 and in the direction of the arrows.

DESCRIPTION OF THE EMBODIMENT

The embodiment is a front wheel dropout member 10, which is a separately formed, plate-like part that is attached to the lower end of a tubular fork leg 12 by a weldment 14. The illustrated dropout member 10 and the fork leg are aluminum, and the dropout member is a piece cut to the desired thickness from an extruded blank having the cross-sectional profile of the finished piece (see FIG. 2).

The dropout member 10 has a body portion 10a and a pair of arm portions 10b and 10c extending from the body portion and defining a slot 10d that receives an end portion of a tubular bicycle wheel axle (shown in dotted lines 16) in seated relation at the base of the slot. Each arm portion has a distal part 10b', 10c' projecting outwardly with respect to the perimeter of a fastener 18 by which the wheel is attached to the dropout. The fastener shown in FIG. 1 is the cam nut of a quick release skewer, which has an operating lever 18a that moves a movable ring 18b of the nut axially when it is pivoted about an axis extending generally radially of the axis of the wheel axle, thereby either clamping the ring firmly against the dropout or releasing the ring so that the wheel can be removed from or reinstalled in the dropout.

The distal part 10b', 10c' of each arm portion of the dropout member has a hole 10d, 10e closely adjacent the perimeter of the fastener 18. A stop member 20 is detachably received in the hole in each arm portion and has a stop head portion 20a positioned abreast of the fastener such as to be engaged by the fastener if the wheel axle should unseat from the base of the slot and to stop the wheel from detaching from the dropout member. In the illustrated embodiment, the holes 10d and 10e are threaded and the stop members 20 are allen head cap screws. Allen head cap screws are preferred, because they are commercially available, easy to install tightly and to remove, have relatively large cylindrical heads that project out from the outer face of the dropout member, and provide a constant standoff distance abreast of the fastener 18, regardless of their rotational position in the receiving hole, as compared with, for example, hex head or square head screws.

The threaded hole 10f in the body 10a of the dropout member is for optional use with accessories, such as the supporting struts of a carrier rack.

The bicycle owner can chose to leave the stop members installed on the dropout members for assurance that the wheel will be prevented from detaching if the axle is not securely clamped in place. In that case, removal and reinstallation of the wheel will require that one or more nuts used to attach it will have to be backed off to enable them to clear the stop members. Alternatively, the owner may chose to remove the stop members so that the wheel can be detached more quickly and easily, in that it will be necessary only to loosen but not to back off the fasteners.

It will be apparent to those skilled in the art that the invention is susceptible of numerous variations and modifications, some of which have been mentioned above. For example, the shapes of the dropout members and the materials from which they are made are not limited to those described and shown herein. The dropout members can be integral with the front fork legs or the chain stays, rather than separate parts fastened to the fork legs or chain stays. The invention can be used not only for bicycles that have quick release skewers but for those in which the wheels are fastened to the dropout members by ordinary nuts threaded onto the axles.

The stop members can take various forms, such as studs or pins press fit into holes and capable of being knocked out. A stop member can be installed on only one arm of the dropout member, or there can be stop members on both arms, as in the exemplary embodiment described above. Stop members screwed into the dropout member can be more securely fastened to the dropout members by an adhesive or with lock washers, if desired. The embodiment can be used interchangeably on both the right and left fork legs, but that is not a requirement. It is desirable, though not essential, that both dropout members for a wheel have stop members for maximum assurance against accidental detachment of the wheel. While the invention is applicable to rear wheel dropouts, its primary usefulness is for front wheels; the rear wheel of a bicycle is somewhat less prone to becoming detached because the drive chain tends to impede dislocation of the wheel axle.

I claim:

1. A bicycle wheel axle dropout member having a body portion and a pair of arm portions extending from the body portion and defining a slot having a base and being adapted to receive a portion of a bicycle wheel axle in seated relation at the base of the slot whereby the wheel axle is affixed to the dropout member by a fastener having a perimeter, at least one of said pair of arm portions having a distal part projecting outwardly in a direction generally opposite from the base of the slot with respect to the perimeter of the fastener, a hole in the distal part of said one of said arm portions closely adjacent a portion of the perimeter of the fastener, and a stop member detachably received in the hole in said one of said arm portions and having a stop head portion positioned abreast of the fastener such as to be engaged by the fastener if the wheel axle should unseat from the base of the slot and to stop the wheel axle from detaching from the dropout member.

2. A bicycle wheel axle dropout member according to claim 1 wherein the hole is threaded and the stop member is a screw.

3. A bicycle wheel axle dropout member according to claim 2 wherein the stop member is a screw having a head that is substantially cylindrical.

4. A bicycle wheel axle dropout member according to claim 2 wherein the screw is an allen head cap screw having a substantially cylindrical head portion.

* * * * *